United States Patent [19]

Yoon

[11] 4,407,238

[45] Oct. 4, 1983

[54] METHANOL DISSOCIATION USING A COPPER-CHROMIUM-MANGANESE CATALYST

[75] Inventor: Heeyoung Yoon, McMurray, Pa.

[73] Assignee: Conoco Inc., Stamford, Conn.

[21] Appl. No.: 315,115

[22] Filed: Oct. 26, 1981

[51] Int. Cl.$^3$ .................. C01B 1/13; C10G 13/02
[52] U.S. Cl. ................ 123/3; 123/DIG. 12; 252/373; 423/415 A; 423/648 R
[58] Field of Search ............ 423/415 A, 648 R; 252/373; 518/712; 123/3

[56] References Cited

U.S. PATENT DOCUMENTS

| | | | |
|---|---|---|---|
| 2,425,625 | 8/1947 | Larson | 423/648 R |
| 3,897,471 | 7/1975 | Herbert et al. | 252/373 |
| 3,986,350 | 10/1976 | Schmidt | 123/3 |
| 4,046,522 | 9/1977 | Chen et al. | 123/3 |
| 4,086,877 | 5/1978 | Henkel et al. | 123/1 A |
| 4,088,450 | 5/1978 | Kosaka et al. | 23/288 L |
| 4,091,086 | 5/1978 | Hindin et al. | 423/648 R |
| 4,110,256 | 8/1978 | Takeuchi et al. | 252/465 |
| 4,170,200 | 10/1979 | Takeuchi et al. | 123/3 |
| 4,175,115 | 11/1979 | Ball et al. | 423/415 A |
| 4,263,141 | 4/1981 | Möller et al. | 518/712 |
| 4,282,835 | 8/1981 | Peterson et al. | 123/3 |

OTHER PUBLICATIONS

Kikuchi et al., "Catalyst for On-Board Reforming of Methanol", J. Japan Petrol. Inst., vol. 23, No. 5 (1980), pp. 328-332.
Kester et al., IECEC'75 Record, On-Board Steam-Reforming of Methanol to Fuel the Automotive Hydrogen Engine.
Heffner et al., Advances in Chemistry Ser. #47 1965, Hydrogen Generating Plant Based on Methanol Decomposition.
United Catalyst, 1980 pp. 8 and 13.

*Primary Examiner*—O. R. Vertiz
*Assistant Examiner*—Wayne A. Langel
*Attorney, Agent, or Firm*—Dale Lovercheck; William A. Mikesell, Jr.

[57] ABSTRACT

A process for the production of hydrogen and carbon monoxide comprising contacting methanol in the vapor phase with a catalyst at a temperature in the range of about 250° to 900° F., a pressure in the range of from 0.1 to 50 atmospheres absolute and a contact time of 0.1 to 100 seconds whereby hydrogen and carbon monoxide are formed, said catalyst comprising manganese, copper and chromium.

7 Claims, No Drawings

METHANOL DISSOCIATION USING A COPPER-CHROMIUM-MANGANESE CATALYST

BACKGROUND OF THE INVENTION

Henkel et al in U.S. Pat. No. 4,086,877 disclose fuel gas reforming by catalytic reaction. Carbon monoxide and hydrogen formed by the decomposition of methanol may be used in an internal combustion engine and a reformed gas generator.

Hindin et al in U.S. Pat. No. 4,091,086 disclose production of hydrogen by steam reforming using a mixture of zinc oxide, copper oxide, thorium oxide and aluminum oxide.

Ball et al in U.S. Pat. No. 4,175,115 disclose the production of synthesis gas from methanol using a rhodium and copper mixture supported on silica.

Takeuchi et al in U.S. Pat. No. 4,110,256 disclose catalytic reforming into hydrogen of methanol using a mixture of Cu-Ni-Cr supported of a $\gamma$-$Al_2O_3$ carrier.

Kosaka et al in U.S. Pat. No. 4,088,450 disclose hydrogen generation from methanol using a zinc oxide-copper oxide catalyst.

United Catalyst, 1980 pages 8 and 13 discloses hydrogenation of functional groups with Cu/Cr/Mn catalyst.

SUMMARY OF THE INVENTION

A process for the production of hydrogen and carbon monoxide comprising contacting methanol in the vapor phase with a catalyst at a temperature in the range of about 250° to 900° F., a pressure in the range of from 0.1 to 50 atmospheres absolute and a contact time 0.1 to 100 seconds whereby hydrogen and carbon monoxide are formed, said catalyst comprising manganese, copper and chromium.

DETAILED DESCRIPTION OF THE INVENTION

The invention relates to the dissociation of methanol in accordance with the endothermic reaction $$CH_3OH \rightarrow CO + 2H_2 \qquad \text{I.}$$

The hydrogen and carbon monoxide mixture may be fed as fuel to an internal combustion engine after mixing with air. Houseman et al 11th IECEC, 1976 discusses the benefits of using hydrogen made from methanol as an internal combustion engine fuel.

In operation liquid methanol conveyed from a fuel tank is first vaporized then dissociated prior to being mixed with air and then combusted in an internal combustion engine.

Improved dissociation of methanol is provided by using a Cu/Cr/Mn catalyst. Since methanol dissociation and vaporization are endothermic, the dissociated gas is higher in heating value than liquid methanol. The increase in heating value appears as an increase in the overall thermal efficiency of the fuel system. The excellent flame properties of the dissociated gas further improves the thermal efficiency of the system. With one hundred percent dissociation, theoretically about fifty percent improvement in thermal efficiency as compared to the conventional gasoline engines system is expected.

Table I presents a comparison of average percent dissociation for the known catalyst Cu/Zn (Example I) and Cu/Cr/Mn (Example 2) the catalyst of the present invention at the conditions specified.

In both Example 1 and Example 2 liquid methanol is fed at a measured flow rate into a vaporizer maintained at 250° F. The methanol vapor is fed into a tubular isothermal reactor containing the specified catalyst. The output from the reactor is fed to a condenser. The condensate is collected for two hours then it is weighed and analyzed. The gas volume flow rate from the condenser is measured and the gas analyzed.

Prior to the process of Example 1, the Cu/Zn catalyst is reduced from CuO/ZnO. The reduction of the oxide is provided at 410° F. at 1.5 atmospheres pressure for eight hours using a reducing atmosphere of 2% $H_2$ and 98% $N_2$. Similarly prior to the process of Example 2 the Cu/Cr/Mn catalyst is reduced from $CuO/Cr_2O_3/MnO$. The reduction of the oxide is carried out under the reducing conditions mentioned above, namely, at 410° F. at 1.5 atmospheres for 8 hours using a reducing atmosphere of 2% $H_2$ and 98% $N_2$.

In the examples in Table I, the methanol vapor feed rate is shown in inverse hours. This represents cubic centimeters of methanol vapor feed per cubic centimeter of catalyst-hour at 25° F. and 1 atmosphere of pressure.

In Example 1, the catalyst used was United Catalyst G-66B in tablet form with about 33% CuO and about 65% ZnO.

In Example 2 the catalyst used was United Catalyst G-89 in tablet form with a content of about 39% copper, about 37% chromium and about 3% manganese.

TABLE I

| Example | Catalyst | Reactor Temperature °F. | Reactor Pressure (psig) | Methanol Vapor Feed-rate ($hr^{-1}$) | Percent Dissociation |
|---|---|---|---|---|---|
| 1 | Cu/Zn | 450 | 15 | 1000 | 4.5 |
|  |  | 500 | 15 | 1000 | 11.9 |
|  |  | 550 | 15 | 1000 | 33.9 |
| 2 | Cu/Cr/Mn | 450 | 15 | 1000 | 54.6 |
|  |  | 500 | 15 | 1000 | 74.0 |
|  |  | 550 | 15 | 1000 | 86.7 |

Table I shows over 50 percent more dissociation of methanol at each reactor temperature with Cu/Cr/Mn than with Cu/Zn.

In the process of the invention the dissociation of methanol is preferably carried out within the temperature range of 300° to 600° F. and the pressure range of 0.1 to 5 atmospheres absolute. Most preferably the dissociation temperature is within the ranges of 400° to 550° F. and the pressure is about 2 atmosphere absolute.

The dissociation catalyst is preferably supported by alumina or silica. Oxides of chromium and copper may be present in the catalyst.

Preferably, the Cu/Cr/Mn catalyst is 5 to 70% copper 2 to 70% chromium, and 0.1 to 30% manganese.

The Cu/Cr/Mn catalyst of the invention is very stable. At 150 hours of use at 450° F. it loses less than 5% of its activity.

The catalyst of the present invention provides improved selectivity in that less methyl formate is formed using it than when the Cu/Zn catalyst is used. The formation of methyl formate is exothermic, thus its formation lowers the thermal efficiency of the dissociation of methanol (an endothermic reaction) for use as a fuel.

While the present invention has been disclosed by reference to certain of its preferred embodiments, it is pointed out that the embodiments set forth are illustrative rather than limiting in nature and that many variations and modifications are possible within the scope of the present invention. Many such variations and modifications may be considered obvious or desirable to those skilled in the art based upon a review of the foregoing description of preferred embodiments.

What is claimed is:

1. A method of endothermic dissociation of methanol to hydrogen and combustion thereof in an internal combustion engine comprising the steps of:
   (a) providing a liquid methanol fuel, said liquid fuel being substantially methanol and comprising no substantial amount of water and comprising molecular oxygen in at most an insubstantial amount,
   (b) providing catalytic reactor means, said catalytic reactor means containing a catalyst consisting essentially of manganese, copper and chromium,
   (c) providing an internal combustion engine means,
   (d) vaporizing said liquid fuel to form a vapor fuel,
   (e) dissociating said vapor fuel in said catalytic reactor means to form a hydrogen rich gaseous fuel,
   (f) mixing said hydrogen rich gaseous fuel with air to form a gaseous combustion mixture comprising hydrogen and oxygen,
   (g) combusting said gaseous combustion mixture in said internal combustion engine means,
   whereby methanol is dissociated to hydrogen which is then combusted in said internal combustion engine.

2. The process of claim 1 wherein said catalyst is supported by alumina or silica.

3. The process of claim 1 wherein said temperature is 300° to 600° F.

4. The process of claim 1 wherein said catalyst further comprises oxides of manganese, copper and chromium.

5. The process of claim 1 wherein said pressure is in the range of from 0.1 to 5 atmospheres absolute.

6. The process of claim 1 wherein said catalyst is 5 to 70 percent copper, 2 to 70 percent chromium and 0.1 to 30 percent manganese.

7. The process of claim 1 wherein said temperature is in the range of 400° to 550° F. and said pressure is in the range of 0.1 to 5 atmospheres absolute.

* * * * *